United States Patent
Bailey

(10) Patent No.: US 9,281,943 B1
(45) Date of Patent: Mar. 8, 2016

(54) DEFENDING AGAINST FACTORING BY COLLISION

(75) Inventor: Daniel V. Bailey, Pepperell, MA (US)

(73) Assignee: EMC Corporation, Hopkinton, MA (US)

( * ) Notice: Subject to any disclaimer, the term of this patent is extended or adjusted under 35 U.S.C. 154(b) by 801 days.

(21) Appl. No.: 13/534,879

(22) Filed: Jun. 27, 2012

(51) Int. Cl.
*H04K 1/04* (2006.01)
*H04L 9/22* (2006.01)
*H04L 9/18* (2006.01)

(52) U.S. Cl.
CPC ... *H04L 9/22* (2013.01); *H04L 9/18* (2013.01)

(58) Field of Classification Search
CPC .............. H04L 9/22; H04L 9/26; H04L 9/18; H04L 9/3226
See application file for complete search history.

(56) References Cited

U.S. PATENT DOCUMENTS

| 5,201,000 | A | * | 4/1993 | Matyas et al. | 380/30 |
| 8,266,435 | B2 | | 9/2012 | Spalka et al. | |
| 2008/0133564 | A1 | * | 6/2008 | Gandolph et al. | 707/101 |
| 2011/0119306 | A1 | * | 5/2011 | Patil | 707/783 |
| 2011/0145581 | A1 | * | 6/2011 | Malhotra et al. | 713/171 |
| 2012/0087494 | A1 | * | 4/2012 | Spalka et al. | 380/46 |

OTHER PUBLICATIONS

A.K. Lenstra, J.P. Hughes, M. Augier, J.W. Bos, T. Kleinjung, C. Wachter, "Ron Was Wrong, Whit is Right." IACR Cryptology ePrint Archive 2012 (2012): 64.
Prudy, G., "The Secure Generation of RSA Moduli Using Poor RNG." arXiv:1202.4366v1 [cs.CR].

* cited by examiner

*Primary Examiner* — Nirav B Patel
*Assistant Examiner* — Mohammed Waliullah
(74) *Attorney, Agent, or Firm* — BainwoodHuang

(57) ABSTRACT

An improved technique involves combining a random seed with unique identifying information to form an input into a RNG. Along these lines, a key pair generator obtains a primary random seed through an interaction with a random process from a web server on which the key pair generator runs. Before putting the primary random seed into a RNG, however, the key pair generator obtains a web domain name that uniquely identifies the web server. The key pair generator concatenates the web domain name, the primary random seed, and an epoch time to produce a secondary random seed. The key pair generator inputs the secondary random seed into the RNG, obtains a large integer output, and finds a first prime factor of a modulus of the public key near the large integer through a search technique.

19 Claims, 4 Drawing Sheets

DEFENDING AGAINST FACTORING BY COLLISION

BACKGROUND

Public key cryptography with the RSA cryptosystem involves generating a pair of keys that serve to encrypt or decrypt confidential communications sent over the Internet: a private key that a party keeps as a secret, and a public key that the party publishes on the Internet. For example, suppose that a first party wishes to ensure that a fraudster has not tampered with a confidential message sent to him from a second party. The second party encrypts the message with the public key before sending the message; the first party subsequently decrypts the encrypted message with the private key.

The generation of certain pairs of keys involves generating a pair of prime numbers, a prime number being a number that has no factors except unity and itself. The private key includes knowledge of the prime numbers, while the public key includes the product of the pair. Communications encrypted with such a public key are reasonably secure when the prime numbers are sufficiently large (typically more than 512 bits), because there does not exist an efficient algorithm for performing a prime factorization of an arbitrary large integer. That is, it is impractical to attempt to ascertain a private key, which includes knowledge of the prime factors of a large integer, from a public key, which includes the large integer, also known as the modulus of the public key.

A conventional key pair generator produces prime numbers using a random number generator (RNG). Along these lines, the key pair generator employs the following process in obtaining a prime number: i) obtain a random seed from some random process (e.g., a physical process in physical hardware that exhibits randomness); ii) input the random seed into the RNG to produce an integer output; and iii) find a prime factor near this integer through a search technique. The key pair generator finds the other prime factor by repeating the above process.

SUMMARY

Unfortunately, there are deficiencies with the above-described conventional key pair generator. For example, the security of public key cryptography using the conventional key pair generator may be compromised by poor quality random number generation. An RNG typically takes the form of a pseudo-RNG (PRNG) that takes as input a random seed; inputting the same random seed into such a RNG results in the same output (i.e., prime factor). Along these lines, a conventional key pair generator often produces random seeds in virtual machine (VM) environments instead of through a direct interaction with physical hardware. Oftentimes, a VM is often replicated across different platforms for various reasons (e.g., backup or transfer to another computer system). By relying on a replicated VM for generating a random seed rather than the direct interaction with hardware, the key pair generator may obtain the same value of the random seed across the different platforms.

It should be understood that having two different public key moduli with a common prime factor may result in a breach of the security provided by a public key cryptography scheme; such a scenario is known as a collision. While two distinct public key moduli having a common prime factor each remain difficult to factor, the common prime factor of the two moduli is relatively easy to find using Euclid's Algorithm. A determined fraudulent user merely needs to apply Euclid's algorithm to pairs of public key moduli in order to determine any common factors, or collisions. The fraudulent user can then use the collisions to undermine the security provided by public key cryptography that uses the conventional key pair generator.

In contrast to the above-described conventional key pair generators which run the risk of collisions due to poor quality random number generation, an improved technique involves combining a random seed with unique identifying information to form an input into a RNG. Along these lines, a key pair generator obtains a primary random seed through an interaction with a random process from a web server on which the key pair generator runs. Before putting the primary random seed into a RNG, however, the key pair generator obtains a web domain name that uniquely identifies the web server. For example, such a web domain name may take the form "uniquewebserver.com." The key pair generator concatenates the web domain name, the primary random seed, and an epoch time to produce a secondary random seed. The key pair generator inputs the secondary random seed into the RNG, obtains a large integer output, and finds a first prime factor of a modulus of the public key near the large integer through a search technique. The key pair repeats the above process for the second prime factor of the modulus of the public key.

Advantageously, the improved technique dramatically lowers the likelihood of collisions. Because the improved technique involves combining a random seed with an identifier unique to a computer system on which the key pair generator runs, it is extremely unlikely that random seeds on different platforms would ever be identical. Further, appending a measure of time onto the random seed ensures that subsequent random seeds are distinct, even on the same computer system. It is this distinctness of the random seeds that dramatically increases the entropy of the random number generation and prevents collisions.

One embodiment of the improved technique is directed to a method of providing data security via cryptography to a user having a unique user identifier. The method includes obtaining, by a computer, a first string of bits configured to be input as a seed into a random number generator (RNG), the RNG being configured to i) run on the computer and ii) generate a random string of bits of a specified length from an input seed. The method also includes extracting, by the computer, an auxiliary string of bits, the auxiliary string of bits being based on the unique user identifier, the unique user identifier being distinct from other user identifiers belonging to other users. The method further includes combining, by the computer, the auxiliary string of bits with the first string of bits to produce a second string of bits. The method further includes inputting, by the computer, the second string of bits as a seed into the RNG to produce an output string of bits having the specified length. The method further includes producing, by the computer, an output number from the output string of bits, the output number being used to form a key that is unique to the user for the cryptography.

Additionally, some embodiments of the improved technique are directed to a system constructed and arranged to provide data security via public key cryptography to a user having a unique user identifier. The system includes a memory and a processor coupled to the memory, the processor configured to carry the method of providing data security via cryptography to a user having a unique user identifier.

Furthermore, some embodiments of the improved technique are directed to a computer program product having a non-transitory computer readable storage medium which stores code including a set of instructions to carry the method of providing data security via cryptography to a user having a unique user identifier.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique involves combining a random seed with unique identifying information to form an input into a RNG. Along these lines, a key pair generator obtains a primary random seed through an interaction with a random process from a web server on which the key pair generator runs. Before putting the primary random seed into a RNG, however, the key pair generator obtains a web domain name that uniquely identifies the web server. For example, such a web domain name may take the form "uniquewebserver.com." The key pair generator concatenates the web domain name, the primary random seed, and an epoch time to produce a secondary random seed. The key pair generator inputs the secondary random seed into the RNG, obtains a large integer output, and finds a first prime factor of a modulus of the public key near the large integer through a search technique. The key pair repeats the above process for the second prime factor of the modulus of the public key.

Advantageously, the improved technique dramatically lowers the likelihood of collisions. Because the improved technique involves combining a random seed with an identifier unique to a computer system on which the key pair generator runs, it is extremely unlikely that random seeds on different platforms would ever be identical. Further, appending a measure of time onto the random seed ensures that subsequent random seeds are distinct, even on the same computer system. It is this distinctness of the random seeds that dramatically increases the entropy of the random number generation and prevents collisions.

Figure 1:
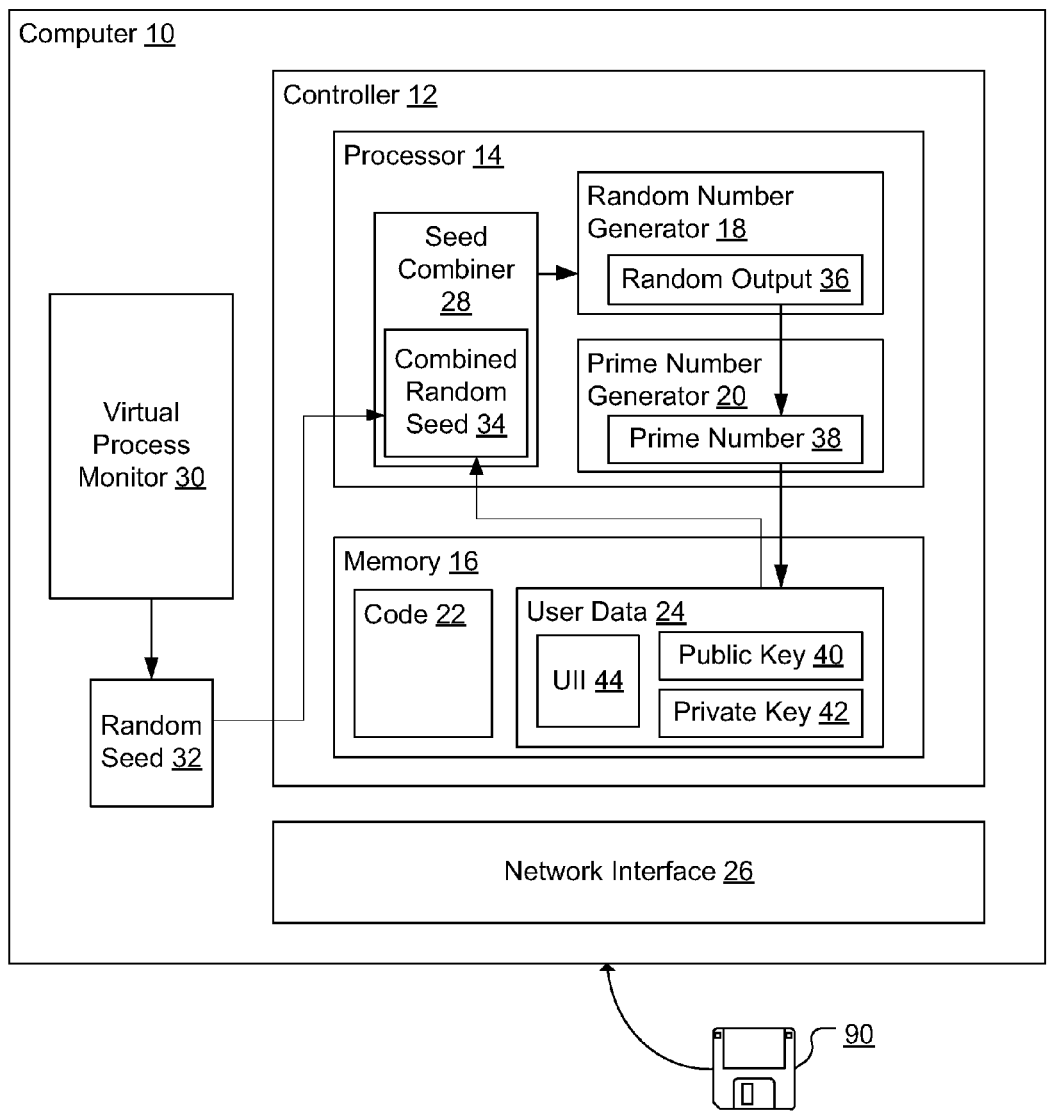
FIG. 1 is a block diagram illustrating a computer for carrying out the improved technique.

FIG. 1 illustrates a computer 10 for carrying out the improved technique. Computer 10 includes controller 12, which in turn includes processor 14 and memory 16, network interface 26, and virtual process monitor 30.

Virtual process monitor 30 includes instructions to produce a random seed 32 from a random process associated with computer 10. Virtual process monitor 30, in some arrangements, receives data from physical noise sources such as zener diodes that produce shot noise, resistors that produce thermal noise, and clock drift. It should be understood, however, that virtual process monitor 30 is, in some arrangements, part of a virtual machine (VM) environment removed from the actual physical hardware of computer 10.

Memory 16 is configured to store code 22 and user data 24. Memory 16 generally takes the form of, e.g., random access memory, flash memory or a non-volatile memory.

Code 22 includes instructions to provide data security via public key cryptography to a user having a unique user identifier.

User data 24 includes a public key 40 and private key 42. Public key 40 includes two integer values: a modulus, which is a large value n typically having 2048 bits, and an exponent e. If the modulus has a value n=Pq, where p and q are the prime factors of n, then the exponent e is an integer coprime with, and less than, (p−1)(q−1). Private key 42 includes a modulus equal to n, and another exponent d which is the unique number that satisfies the following congruence:

$$ed \equiv 1 (\mathrm{mod}\ [(p-1)(q-1)]).$$

It should be understood that the exponent d of public key 42 should not be able to be determined without knowledge of the individual prime factors p and q. It should also be understood that there may be other ways to compute the exponent d of public key 42 that depend on knowledge of the individual prime factors p and q.

In some arrangements, user data 24 also includes unique identifying information 44 that identifies a user of computer 10. For example, when computer 10 is a web server, unique identifying information 10 may take the form of a web domain name.

Processor 14 takes the form of, but is not limited to, Intel or AMD-based MPUs, and can include a single or multi-cores each running single or multiple threads. Processor 14 is coupled to memory 16 and is configured to execute code 22 stored in memory 16. Processor 54 includes random number generator 18, prime number generator 20, and seed combiner 28.

Random number generator 18 is a pseudorandom number generator (PRNG) that includes instructions from code 22 configured to take as input random seed 34 and produce a random output 36. Random number generator 18 is configured to produce, as random output 36, an integer having at least 512 bits, preferably 2048 bits. In some arrangements, random number generator 18 is a cryptographically secure PRNG (CSPRNG).

Prime number generator 20 includes instructions from code 22 to take as input an integer such as random output 36 and return a prime number through a prime number search algorithm such as a primality test.

Seed combiner 28 includes instructions to extract unique identifying information 44 from computer 10 (e.g., from user data 24 stored in memory 16). Seed combiner 28 also includes instructions to combine unique identifying information 44 with random seed 32 to produce combined random seed 34. Details of the instructions to combine unique identifying information 44 with random seed 32 are discussed below with respect to FIG. 3.

Figure 3:
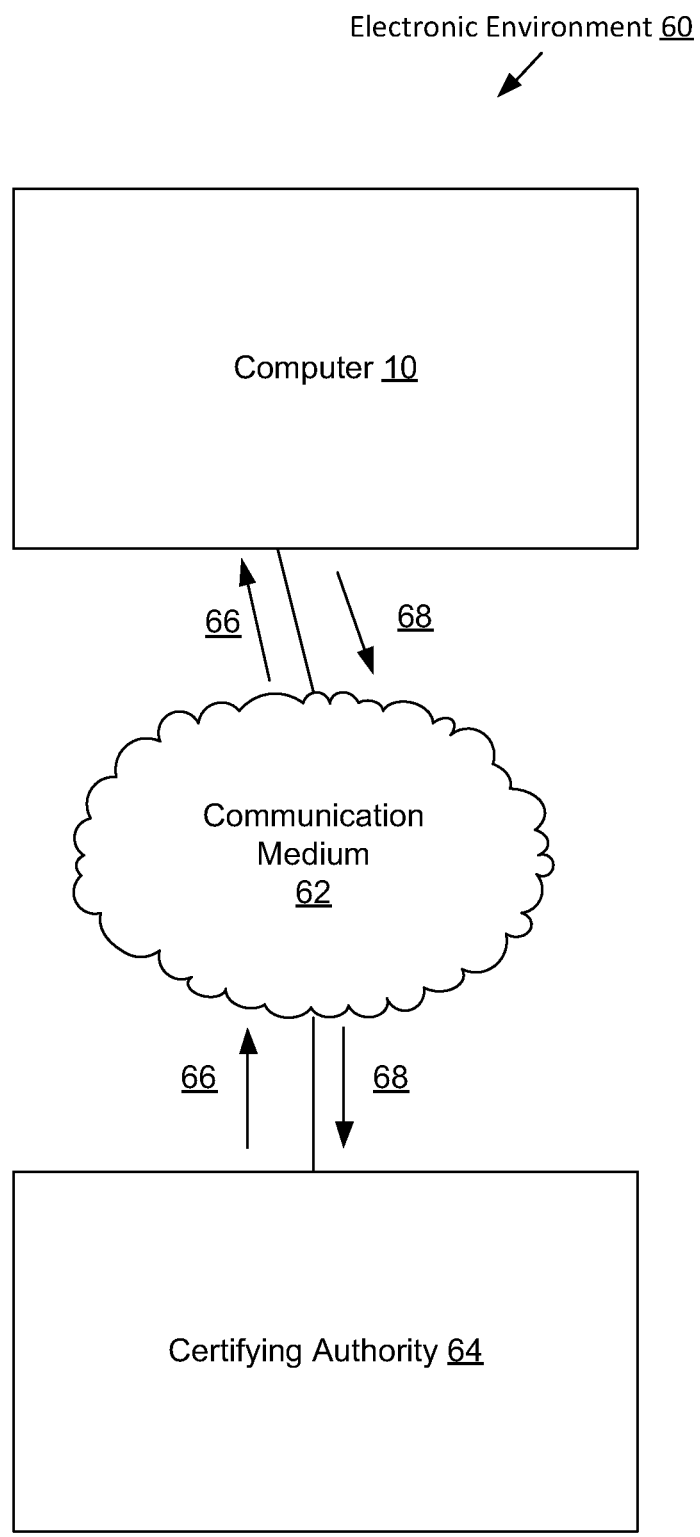
FIG. 3 is a block diagram illustrating a seed combiner used in the computer shown in FIG. 1.

Network interface 26 is constructed and arranged to send and receive data over communication medium 62 (see FIG. 3).

During operation, virtual process monitor 30 obtains a number from a measurement of a physical process associated with computer 10. In some arrangements, the number is a combination of shot noise, thermal noise, and clock drift outputs obtained from within the VM environment. It should be understood, however, that if the VM environment has been transferred onto processor 14 from some other platform, the number can be obtained from observations made on the other platform. It should also be understood that, while in some arrangements the number may be in the form of a floating-point decimal, in other arrangements the number may take the form of an integer in decimal, binary, octal, or hexadecimal format. Upon obtaining the number, virtual process monitor 30 converts the number into random seed 32 in binary format.

Upon producing random seed 32, virtual process monitor 30 sends random seed 32 to seed combiner 28. Upon receiving random seed 32, seed combiner 28 extracts unique identifying information (UII) 44 from memory 16 and converts UII 44 to binary format. For example, when UII 44 is "uniquewebserver.com," the equivalent binary form is derived from the equivalent ASCII format. In other arrangements, UII 44 takes the form of an email address, a username, or an identifying number.

Seed combiner 28 combines random seed 32 with the UII 44 to create a combined random seed 34 in binary format. Further details of the combination process are described below with respect to FIG. 2.

Figure 2:
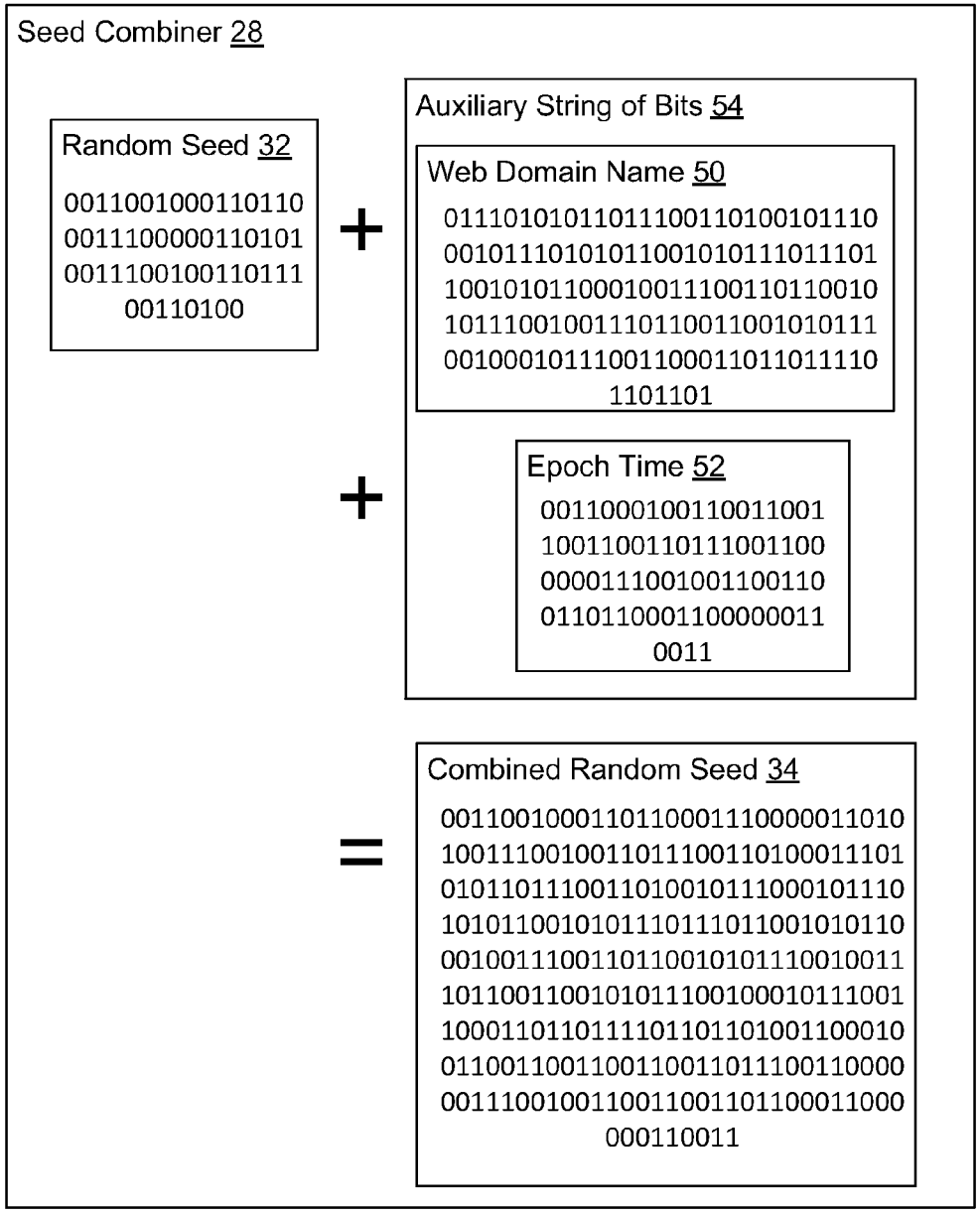
FIG. 2 is a block diagram illustrating an electronic environment which uses the computer shown in FIG. 1.

FIG. 2 illustrates a concatenation process performed by random seed combiner 28 on a web server. Random seed 32 is expressed in binary format (2685974') as an ASCII string. In some arrangements, random seed 32 is expressed after numerically converting a decimal, octal, or hexadecimal to binary.

Seed combiner 28 also obtains a web domain name 50 in order to ensure that input into a random number generator (RNG) remains unique for a single user. Web domain name 50 acts as UII 44 (see FIG. 1) and is also expressed in binary format after conversion from text in ASCII format (uniquewebserver.com) to form an auxiliary string of bits 54.

In some arrangements, seed combiner 28 also uses additional information to further distinguish input into a RNG from any other input performed on computer 10 (see FIG. 1) at any other time. Along these lines, seed combiner 28 obtains an epoch time 52 as a number of seconds that has elapsed since a fixed date, e.g., Jan. 1, 1970. In some arrangements, the epoch time is expressed in a different time unit, e.g., milliseconds. In this case, seed combiner 28 appends epoch time 52 to web domain name 50 to produce auxiliary string of bits 54.

Seed combiner 28 appends auxiliary string of bits 54 to random seed 32 to create random seed 34 in binary. In other arrangements, seed combiner 28 performs a random shuffle of the bits of random seed 32 and web domain name 50.

Referring back to FIG. 1, seed combiner 28 inputs combined random seed 34 into a random number generator (RNG) 18. RNG 18 then produces a random output 36 as a positive integer of at least 512 bits in length; preferably, random output 36 is 2048 bits in length. In some arrangements, RNG 18 expresses random output 36 in a decimal format.

RNG 18 then inputs random output 36 into prime number generator 20. Prime number generator 20 then produces a prime number having a value close to that of random output 36. For example, prime number 38 is the smallest prime number greater than random output 36. Prime number generator 20 stores prime number 38 as prime factor p in memory 16.

To obtain the other prime factor q, computer 10 repeats the process described above with respect to FIG. 1 and FIG. 2 to obtain a second prime number 38 as prime factor q. Processor 14 then forms public key 40 and private key 42 from prime factors p and q as described above. It should be understood that an epoch time 52 will have a different, greater value in the generation of the prime factor q than that for the prime factor p. Such a different epoch time 52 ensures that the corresponding random seeds input into RNG 18 will be distinct.

In some arrangements, when computer 10 is a web server, computer 10 requires a digital certificate as proof of an association between public key 40 and computer 10 to a third party. Such proof is used in Transport Layer Security (TLS), for example. Details of the process of obtaining a digital certificate are discussed with respect to FIG. 3 below.

FIG. 3 illustrates an electronic environment 60 in which computer 10 obtains a digital certificate 66. Electronic environment 60 includes computer 10, communication medium 62, and certifying authority 64.

Communication medium 62 provides network connections between computer 10 and certifying authority 64. Communications medium 62 may implement a variety of protocols such as TCP/IP, UDP, ATM, Ethernet, Fibre Channel, combinations thereof, and the like. Furthermore, communications media 62 may include various components (e.g., cables, switches/routers, gateways/bridges, NAS/SAN appliances/nodes, interfaces, etc.). Moreover, the communications medium 62 is capable of having a variety of topologies (e.g., queue manager-and-spoke, ring, backbone, multi drop, point to-point, irregular, combinations thereof, and so on).

Certifying authority 64 provides digital certificates 66 upon certification of an association of a computer system that generated a public key and the public key itself.

During operation, computer 10 sends a request 68 for a digital certificate to certifying authority 64 through communication medium 62. Request 68 includes public key 40 as well as data proving that public key 40 was generated by computer 10. In some arrangements, computer 10 encrypts a message 40 with private key 42 and includes the encrypted message as part of request 68. In turn, certifying authority 64 decrypts the encrypted message in request 68 to reveal the message.

Upon a successful decryption, certifying authority 64 generates digital certificate 66 and sends digital certificate 66 to computer 10 through communication medium 62. In some arrangements, digital certificate 66 includes details of public key 40 that may have been included in the message in request 68.

Figure 4:
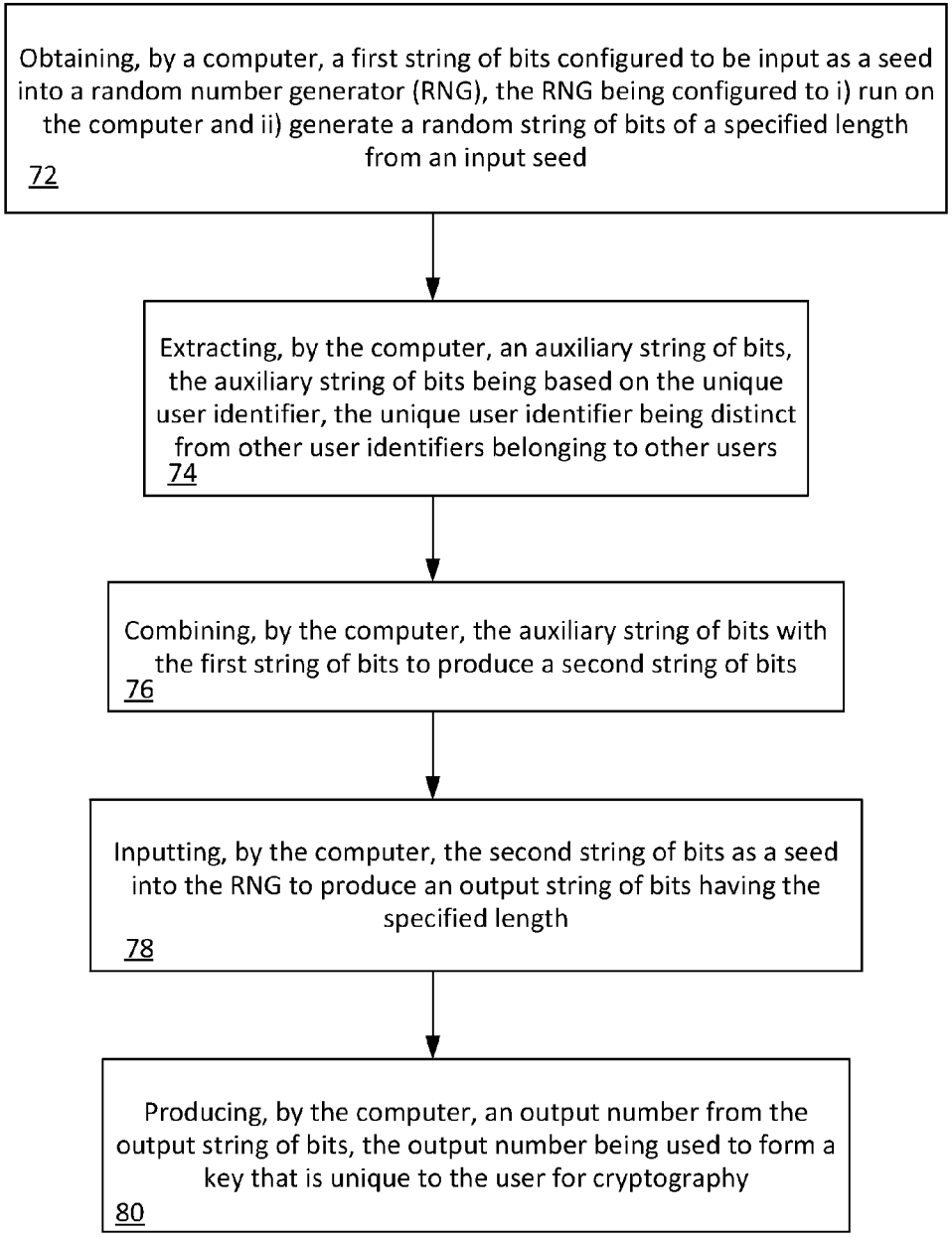
FIG. 4 is a flow chart illustrating a method of carrying out the improved technique with the computer shown in FIG. 1.

FIG. 4 illustrates a method 70 of providing data security via public key cryptography to a user having a unique user identifier. In step 72, a first string of bits configured to be input as a seed into a random number generator (RNG) is obtained, the RNG being configured to i) run on the computer and ii) generate a random string of bits of a specified length from an input seed. In step 74, an auxiliary string of bits is generated, the auxiliary string of bits being based on the unique user identifier, the unique user identifier being distinct from other user identifiers belonging to other users. In step 76, the auxiliary string of bits is combined with the first string of bits to produce a second string of bits. In step 78, the second string of bits is input as a seed into the RNG to produce an output string of bits having the specified length. In step 80, a prime number is produced from the output string of bits, the prime number being used to form a public key that is unique to the user for the public key cryptography.

While various embodiments of the invention have been particularly shown and described, it will be understood by those skilled in the art that various changes in form and details may be made therein without departing from the spirit and scope of the invention as defined by the appended claims.

For example, the above examples discussed using a web address as part of a unique identifier for the random seed. The improved technique is not limited to web addresses and other unique strings like Ethernet MAC address, CPU ID, IMEI, UUID, or other strings the system might have available may be designated as part of the unique identifier.

Furthermore, it should be understood that some embodiments are directed to computer 10 which is constructed and arranged to provide data security via public key cryptography to a user having a unique user identifier. Some embodiments are directed to computer 10. Some embodiments are directed to a system which provides data security via public key cryptography to a user having a unique user identifier. Some embodiments are directed to a process of providing data security via public key cryptography to a user having a unique user identifier. Also, some embodiments are directed to a computer program product which enables computer logic to provide data security via public key cryptography to a user having a unique user identifier.

In some arrangements, the improved technique is implemented by a set of processors or other types of control/processing circuitry running software. In such arrangements, the software instructions can be delivered to computer 10 in the form of a computer program product 90 (FIG. 1) having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A computer-based method of providing data security via cryptography to a user having a unique user identifier, the method comprising:
   obtaining, by a computer, a first string of bits configured to be input as a seed into a random number generator (RNG), the RNG being configured to i) run on the computer and ii) generate a random string of bits of a specified length from an input seed;
   extracting, by the computer, an auxiliary string of bits, the auxiliary string of bits being based on the unique user identifier, the unique user identifier being distinct from other user identifiers belonging to other users;
   combining, by the computer, the auxiliary string of bits with the first string of bits to produce a second string of bits;
   inputting, by the computer, the second string of bits as a seed into the RNG to produce an output string of bits having the specified length; and
   producing, by the computer, an output number from the output string of bits, the output number being used to form a key that is unique to the user for the cryptography;
   wherein the method further comprises:
      receiving, by the computer, a file containing instructions of a virtual machine (VM), the VM being configured to cause the computer to emulate a second computer that is different from the computer;
      executing, by the computer, the VM to emulate the running of a process on the second computer; and
      after executing the VM, obtaining, by the computer, a measurement of a quantity generated in the course of emulating the running of the process;
      wherein obtaining the first string of bits includes deriving the first string of bits from the measurement of the quantity; and
      wherein combining the auxiliary string of bits with the first string of bits includes concatenating the auxiliary string of bits and the first string of bits to form the second string of bits, the key formed by inputting the second string of bits into the RNG being less likely to be involved in a collision than another key formed by inputting the first string of bits into the RNG.

2. The method according to claim 1, wherein the cryptography is public key cryptography; wherein the key is a public key; and wherein producing the number from the output string of bits includes: performing a prime number search operation to obtain a prime number from the output number.

3. The method according to claim 2, wherein concatenating the auxiliary string of bits and the first string of bits includes: producing the second string of bits from the auxiliary string of bits and the first string of bits.

4. The method according to claim 3, wherein the auxiliary string of bits is further based on an amount of time that has passed since a specified date and time; and wherein generating the auxiliary string of bits includes: obtaining, as a temporal string of bits, the amount of time that has passed since the specified date and time; forming an identifier string of bits from the unique user identifier; and performing a concatenation operation on the temporal string of bits and the identifier string of bits to produce the auxiliary string of bits.

5. The method according to claim 3, wherein the unique user identifier includes a web domain name; and wherein extracting the auxiliary string of bits includes: converting the web domain name into a string of bits.

6. The method according to claim 5, wherein the method further comprises: sending the public key to a certifying authority; and receiving a digital certificate from the certifying authority, the digital certificate configured to provide proof to a third party of an association of the public key and the web domain name.

7. A computer-based method of providing data security via cryptography to a user having a unique user identifier, the method comprising:
   obtaining, by a computer, a first string of bits configured to be input as a seed into a random number generator (RNG), the RNG being configured to i) run on the computer and ii) generate a random string of bits of a specified length from an input seed;
   extracting, by the computer, an auxiliary string of bits, the auxiliary string of bits being based on the unique user identifier, the unique user identifier being distinct from other user identifiers belonging to other users;
   combining, by the computer, the auxiliary string of bits with the first string of bits to produce a second string of bits;
   inputting, by the computer, the second string of bits as a seed into the RNG to produce an output string of bits having the specified length; and producing, by the computer, an output number from the output string of bits, the output number being used to form a key that is unique to the user for the cryptography;
   wherein the cryptography is public key cryptography;
   wherein the key is a public key; and
   wherein producing the number from the output string of bits includes:
      performing a prime number search operation to obtain a prime number from the output number;
      wherein the method further comprises combining the prime number with another prime number to form a modulus of the public key;
      wherein combining the prime number with another prime number includes:
         obtaining a third string of bits configured to be input as a seed into the RNG;
         obtaining, as a temporal string of bits, an amount of time that has passed since the specified date and time, the amount of time being greater than another amount of time;
         performing a concatenation operation on the temporal string of bits and the identifier string of bits to produce another auxiliary string of bits;
         combining the other auxiliary string of bits with the third string of bits to produce a fourth string of bits;

inputting the fourth string of bits as a seed into the RNG to produce another output string of bits having the specified length; and producing the other prime number from an application of the prime number search operation to the output string of bits.

8. A computer apparatus for providing data security via cryptography to a user having a unique user identifier, the apparatus comprising:

memory; and a controller having controlling circuitry coupled to the memory, the controlling circuitry being constructed and arranged to:

obtain a first string of bits configured to be input as a seed into a random number generator (RNG), the RNG being configured to i) run on the computer and ii) generate a random string of bits of a specified length from an input seed;

extract an auxiliary string of bits, the auxiliary string of bits being based on the unique user identifier, the unique user identifier being distinct from other user identifiers belonging to other users;

combine the auxiliary string of bits with the first string of bits to produce a second string of bits;

input the second string of bits as a seed into the RNG to produce an output string of bits having the specified length; and produce an output number from the output string of bits, the output number being used to form a key that is unique to the user for the cryptography;

wherein the controlling circuitry is further constructed and arranged to:

receive a file containing instructions of a virtual machine (VM), the VM being configured to cause the computer to emulate a second computer that is different from the computer;

execute the VM to emulate the running of a process on the second computer; and after executing the VM, obtain a measurement of a quantity generated in the course of emulating the running of the process;

wherein obtaining the first string of bits includes deriving the first string of bits from the measurement of the quantity; and wherein combining the auxiliary string of bits with the first string of bits includes concatenating the auxiliary string of bits and the first string of bits to form the second string of bits, the key formed by inputting the second string of bits into the RNG being less likely to be involved in a collision than another key formed by inputting the first string of bits into the RNG.

9. The apparatus according to claim 8, wherein the cryptography is public key cryptography; wherein the key is a public key; and wherein producing the number from the output string of bits includes: performing a prime number search operation to obtain a prime number from the output number.

10. The apparatus according to claim 9, wherein concatenating the auxiliary string of bits and the first string of bits includes: producing the second string of bits from the auxiliary string of bits and the first string of bits.

11. The apparatus according to claim 10, wherein the auxiliary string of bits is further based on an amount of time that has passed since a specified date and time; and wherein generating the auxiliary string of bits includes: obtaining, as a temporal string of bits, the amount of time that has passed since the specified date and time; forming an identifier string of bits from the unique user identifier; and performing a concatenation operation on the temporal string of bits and the identifier string of bits to produce the auxiliary string of bits.

12. The apparatus according to claim 10, wherein the unique user identifier includes a web domain name; and wherein extracting the auxiliary string of bits includes: converting the web domain name into a string of bits.

13. The apparatus as in claim 9, wherein the controlling circuitry is further constructed and arranged to combine the prime number with another prime number to form a modulus of the public key.

14. The apparatus according to claim 13, wherein combining the prime number with another prime number includes: obtaining a third string of bits configured to be input as a seed into the RNG; obtaining, as a temporal string of bits, an amount of time that has passed since the specified date and time, the amount of time being greater than another amount of time; performing a concatenation operation on the other temporal string of bits and the identifier string of bits to produce another auxiliary string of bits; combining the other auxiliary string of bits with the third string of bits to produce a fourth string of bits; inputting the fourth string of bits as a seed into the RNG to produce another output string of bits having the specified length; and producing the other prime number from an application of the prime number search operation to the output string of bits.

15. A computer program product having a non-transitory, computer-readable storage medium which stores code to provide data security via cryptography to a user having a unique user identifier, the code including instructions to:

obtain a first string of bits configured to be input as a seed into a random number generator (RNG), the RNG being configured to i) run on the computer and ii) generate a random string of bits of a specified length from an input seed;

extract an auxiliary string of bits, the auxiliary string of bits being based on the unique user identifier, the unique user identifier being distinct from other user identifiers belonging to other users;

combine the auxiliary string of bits with the first string of bits to produce a second string of bits;

input the second string of bits as a seed into the RNG to produce an output string of bits having the specified length; and produce an output number from the output string of bits, the output number being used to form a key that is unique to the user for the cryptography;

wherein the code includes further instructions to:

receive a file containing instructions of a virtual machine (VM), the VM being configured to cause the computer to emulate a second computer that is different from the computer;

execute the VM to emulate the running of a process on the second computer; and after executing the VM, obtain a measurement of a quantity generated in the course of emulating the running of the process;

wherein obtaining the first string of bits includes deriving the first string of bits from the measurement of the quantity; and wherein combining the auxiliary string of bits with the first string of bits includes concatenating the auxiliary string of bits and the first string of bits to form the second string of bits, the key formed by inputting the second string of bits into the RNG being less likely to be involved in a collision than another key formed by inputting the first string of bits into the RNG.

16. The computer program product according to claim 15, wherein the cryptography is public key cryptography; wherein the key is a public key; and wherein producing the number from the output string of bits includes: performing a prime number search operation to obtain a prime number from the output number.

17. The computer program product according to claim 16, wherein concatenating the auxiliary string of bits and the first string of bits includes: producing the second string of bits from the auxiliary string of bits and the first string of bits.

18. The computer program product according to claim 17, wherein the auxiliary string of bits is further based on an amount of time that has passed since a specified date and time; and wherein generating the auxiliary string of bits includes: obtaining, as a temporal string of bits, the amount of time that has passed since the specified date and time; forming an identifier string of bits from the unique user identifier; and performing a concatenation operation on the temporal string of bits and the identifier string of bits to produce the auxiliary string of bits.

19. The computer program product according to claim 16, wherein the the code includes further instructions to:
  combine the prime number with another prime number to form a modulus of the public key.

* * * * *